United States Patent [19]

Horacek

[11] Patent Number: 5,384,347
[45] Date of Patent: Jan. 24, 1995

[54] FLAME-RESISTANT PLASTICS CONTAINING TRIHYDRAZINOTRIAZINE, TRIGUANIDINOTRIAZINE OR SALTS THEREOF

[75] Inventor: Heinrich Horacek, Puchenau, Austria

[73] Assignee: Chemie Linz Gesellschaft m.b.H., Linz, Austria

[21] Appl. No.: 174,373

[22] Filed: Dec. 28, 1993

[30] Foreign Application Priority Data

Dec. 28, 1992 [AT] Austria ................... 2589/92

[51] Int. Cl.$^6$ ............ C08K 5/3492; C08K 5/55; C08K 5/52
[52] U.S. Cl. ..................... 524/100; 523/506; 523/508
[58] Field of Search .......... 524/100; 544/176; 523/506, 508

[56] References Cited

U.S. PATENT DOCUMENTS

| | | | |
|---|---|---|---|
| 2,197,357 | 4/1940 | Widmer et al. | 544/196 |
| 2,537,840 | 1/1951 | MacLean | 544/196 |
| 3,087,910 | 4/1963 | Wear | 544/196 |
| 3,321,476 | 5/1967 | Nagy | 544/196 |
| 3,331,808 | 7/1967 | Oswald et al. | 524/100 |
| 4,298,518 | 11/1981 | Ohmura et al. | . |
| 5,182,388 | 1/1993 | Cipolli et al. | 544/196 |
| 5,302,640 | 4/1994 | Cipolli et al. | . |

FOREIGN PATENT DOCUMENTS 2740092  5/1990  Germany .
54-13555  2/1979  Japan .

OTHER PUBLICATIONS

Stolle et al., Chemische Berichte, vol. 45, p. 2338 (1954).
Tomomatsu et al., Acta Medica Univ. Kagoshima, vol. 17, No. 2, pp. 99–111 (1975).
Chem. Abstracts, vol. 74: 141885g (1971).

Primary Examiner—Veronica P. Hoke
Attorney, Agent, or Firm—Wenderoth, Lind & Ponack

[57] ABSTRACT

Flame-resistant plastics which contain trihydrazinotriazine and/or triguanidinotriazine and/or the phosphoric acid or boric acid salts thereof as flame retardants.

6 Claims, No Drawings

FLAME-RESISTANT PLASTICS CONTAINING TRIHYDRAZINOTRIAZINE, TRIGUANIDINOTRIAZINE OR SALTS THEREOF

The invention relates to plastics which contain trihydrazinotriazine, triguanidinotriazine or salts thereof to improve their flame resistance.

A large number of flame retardants, for instance halogen-containing or nitrogen-containing flame retardants, are already known. Although the halogen-containing flame retardants, which are at the top of the list in terms of their values, show a good flame-retarding action they have, however, the decisive disadvantage that in the event of fire, especially prolonged fires, they release toxic and corrosive chlorine and bromine compounds. To avoid these disadvantages, halogen-free, nitrogen-containing flame-proofing agents, for example melamine or melamine cyanurate (DE-A 27 40 092) are already employed in many instances. Nitrogen-containing flame retardants withdraw heat from the plastics in the event of fire by melting, subliming or decomposing, and give off noncombustible, nontoxic and noncorrosive gases during this procedure. However, melamine and also melamine cyanurate are unsuitable as flame retardants for a large number of common plastics, such as for polyethylene, polypropylene or polystyrene. When used as a flame retardant, for other plastics, melamine also has the disadvantage, inter alia, that it tends to effloresce during processing of the plastics, which means that it partly migrates to the surface and, for example in injection moulding, can form a troublesome deposit. On the other hand, melamine cyanurate tends to sublime during incorporation into a plastic, which means that the plastic foams somewhat and the bulk density is reduced.

Because of the disadvantages of melamine and melamine cyanurate, the object of the present invention was to discover other nitrogen-containing flame retardants. Unexpectedly, it has been possible to achieve this object with trihydrazinotriazine (THT), triguanidinotriazine (TGT) and the phosphoric acid or boric acid salts thereof.

The invention accordingly relates to flame-resistant plastics, which are characterized in that they contain trihydrazinotriazine and/or triguanidinotriazine and/or the phosphoric acid or boric acid salts thereof.

THT is known as a blowing agent for plastic foams, for example, from WO 90/05123, and its preparation is described, for example, in R. Stolle et al., Chemische Berichte (1954) page 2338.

In contrast, TGT is known as an antitumor agent from H. Tomomatsu et al., Acta Medica Univ. Kagoshima, Volume 17, No. 2, (1975) pages 99–111, and can be prepared, for example, in accordance with Chemical Abstracts 74/141885.

According to the invention, THT, TGT and salts thereof are suitable as flame retardants both for thermoplastics and for thermosetting or elastomeric plastics whose processing temperature is below 280° C. Preferred salts of THT and TGT are boric acid salts and phosphoric acid salts.

Possible plastics are, for example, those from the group comprising polyolefins, for instance, polyethylene, polypropylene or ethylene/propylene copolymers, polybutylene or polymethylpentene, as well as polyvinyl acetates, polyvinyl chloride, polyamides, polystyrene, polyacrylonitriles or polyacrylonitrile-containing plastics, such as, for example, ABS (acrylonitrile/butadiene/styrene copolymer) or SAN (styrene/acrylonitrile copolymer), thermoplastic or crosslinked polyurethanes, unsaturated or crosslinked polyesters, epoxides, acrylic resins and urea-, melamine- or phenol-formaldehyde resins. The plastics can also be foamed. It is furthermore possible to provide mixtures of different plastics or copolymers of different monomers, for example ethylene/propylene copolymers, with a flame-retardant finish with THT or TGT or the phosphoric acid or boric acid salts thereof.

THT, TGT or salts thereof are preferably employed as flame retardants in polyolefins, polystyrene, polyvinyl chloride, unsaturated polyester resins, polyurethanes and epoxides.

In addition to the good flame-retardant action, THT and TGT have the additional advantage that they are sparingly water-soluble, so that they are not dissolved out during washing operations or weathering in the open.

Furthermore, THT, TGT and salts thereof do not effloresce during processing of the plastics, and the bulk density of the plastics provided with a flame-retardant finish is even increased in comparison with the pure plastics.

THT, TGT and salts thereof can be employed individually or together or in combination with other flame retardants. Other suitable flame retardants are, preferably, halogen-free flame retardants based on phosphorus, for example ammonium polyphosphate, phosphoric acid esters and phosphorus, or flame retardants based on boric acid esters.

THT, TGT or salts thereof in which at least 95% by weight has a particle size of not more than 0.025 mm are preferably used.

The flame-resistant plastics are prepared, for example, by mixing THT, TGT or salts thereof with the particular plastic. In the case of thermoplastics, the mixture can also be melted, for example, in an extruder and then homogenized. In the case of reactive resins, it is possible for THT, TGT or their salts to be added to the reaction components of the plastic even during its preparation.

For example, in the case of polyurethanes, it is possible for THT, TGT or salts thereof and if appropriate other flame retardants to be added to the polyols or the polyisocyanates even before the polymerization reaction.

The content of flame retardant in the finished plastic is usually 1 to 40% by weight, preferably 5 to 35% by weight, depending on the nature of the plastic and according to the particular flame resistance requirements.

The following plastics were provided with a flame-retardant finish in the following examples:
PE polyethylene (Daplen 2414D, PCD)
PS polystyrene (PS S 6600 Natur E 990, Shell)
PVC polyvinyl chloride (Vinnol MSA 633/1M, Wacker)

The flame resistance of the plastics was tested by the burning test of Underwriter Laboratories No. 94 (UL 94).

For this, 2 sets of in each case 3 sample pieces 127 mm long, 12.7 mm wide and 3.2 mm thick were prepared. One set of samples was used directly for the test and the other was first dried in an oven at 70° C. for 7 days, dried over calcium chloride and allowed to cool at room temperature for at least 4 hours before it was subjected to the test.

The sample pieces were then positioned vertically above a burner so that the 19 mm high blue flame ended 9.5 mm below the end of the test piece. The flame was directed towards the test piece for 10 seconds and then removed and the burning time of the test piece was measured. If the test piece stopped burning 10 seconds after removal of the flame, the flame was held under the test piece for a further 10 seconds and removed again and the burning time was measured again. Burning class V-0 was achieved if

- all 6 sample pieces did not exceed a maximum burning time of 10 seconds
- no after-burning occurred during or after one of the two applications of flame and
- glowing (visible emission of light which does not originate from the flame) lasted for no longer than a further 10 seconds after the flame after the second application of the test flame is extinguished.

EXAMPLE 1

THT phosphoric acid salt 24 g of 85% strength phosphoric acid and 34.2 g of THT in 70 ml of $H_2O$ were heated to 70° C. After boiling under reflux for 2 hours, the precipitate formed was filtered off, washed with 100 ml of $H_2O$ and dried. Yield 94% of theory

EXAMPLE 2

TGT boric acid salt 6.18 g of boric acid were dissolved in 70 ml of $H_2O$, 25.5 g of TGT were added and the mixture was boiled at the reflux temperature for 3 hours. The precipitate formed was filtered off, washed with 100 ml of $H_2O$ and dried. Yield 90% of theory

EXAMPLE 3

5 kg/hour of Daplen 2414 D and 1.25 kg/hour of THT were metered separately from one another into a twin-screw extruder (LSM 30/34 GL 9R, Leistritz), the mixture was melted at 200° C., homogenized, extruded via a 2 mm perforated die and granulated by cold chopping. The granules were then pressed on a hot press at 150° C. to give sheets 3.2 mm thick, which were tested for their flame resistance in accordance with UL 94. The flame resistance was V-0, corresponding to a maximum after-burning time of 10 seconds after flame application for 10 seconds.

EXAMPLES 4–7

Sample sheets produced from granules of plastic provided with a flame-resistant finish with TGT, THT phosphoric acid salt, TGT phosphoric acid salt or TGT boric acid salt analogously to Example 1, but the plastics and amounts (% by weight) of flame retardants listed in Table 1 were employed.

In all cases, the flame resistance corresponded to burning class V-0.

EXAMPLE 8

PSS 6600 and THT were extruded at 200° C. on a Leistritz twin-screw extruder. The throughput was 5 kg/hour of PSS 6600 and 1.25 kg/hour of THT. After cold chopping, granules with a diameter of about 2 mm were present and were pressed at 200° C. to give sheets 3.2 mm thick.

The flame resistance corresponded to burning class V-0.

EXAMPLE 9

Sample sheets of PSS 6600 and TGT were produced analogously to Example 8. The flame resistance corresponded to burning class V-0.

EXAMPLES 10 AND 11

Vinnol MSA 633/1M was extruded with THT or TGT at 170° C. on a Leistritz twin-screw extruder.

Vinnol MSA 633/1M was metered into the extruder in an amount of in each case 5 kg/hour, and THT or TGT was metered into the extruder in amounts of 1.25 kg/hour.

The melting and homogenization were carried out at 170° C., and the polymer was extruded via a 2 mm perforated die and granulated by means of cold chopping. The granules were pressed at 150° C. to give sheets 3.2 mm thick.

The flame resistance was in each case burning class V-0.

Comparison Examples CI-VIII

Sample sheets of PE, PS and PVC were produced analogously to Example 1 without a flame retardant. The samples burnt, and the flame resistance did not correspond to burning class V-0 corresponding to an after-burning time of not more than 10 seconds.

Comparison Examples CIV-VV

PE was mixed homogeneously with 25 or 50% by weight of melamine cyanurate MC "C" at 180° C. on a twin-screw extruder and the mixture was granulated.

The granules were then pressed to give sheets 3.2 mm thick.

The flame resistance of the two samples in each case corresponded only to burning class V-2.

TABLE 1

| No. | Plastic | Flame retardant | % by weight | Burning class | Granule bulk density g/l |
|---|---|---|---|---|---|
| 1 | PE | THT | 25 | V - 0 | 650 |
| 2 | PE | TGT | 25 | V - 0 | 660 |
| 3 | PE | THT.P | 20 | V - 0 | 660 |
| 4 | PE | TGT.P | 20 | V - 0 | 670 |
| 5 | PE | TGT.B | 20 | V - 0 | 680 |
| 6 | PS | THT | 35 | V - 0 | 700 |
| 7 | PS | TGT | 35 | V - 0 | 690 |
| 8 | PVC | THT | 10 | V - 0 | 750 |
| 9 | PVC | TGT | 10 | V - 0 | 760 |
| CI | PE | — | 0 | burns | 650 |
| CII | PS | — | 0 | burns | 670 |
| CIII | PVC | — | 0 | burns | 700 |
| CIV | PE | MC"C" | 25 | V - 2 | 700 |
| CV | PE | MC"C" | 50 | V - 2 | 720 |

What I claim is:

1. A flame retardant polyolefin, polyvinyl chloride, unsaturated polyester resin, polyurethane or polystyrene which contains 1 to 40% by weight of trihydrazinotriazine, triguanidinotriazine or the phosphoric or boric acid salts thereof or mixtures thereof as flame retardants.

2. Flame-resistant plastics according to claim 1, which contain 5 to 35% by weight of trihydrazinotriazine, triguanidinotriazine or the phosphoric acid or boric acid salts thereof or mixtures thereof as flame retardants.

3. Flame-resistant plastics according to claim 1, which have a processing temperature below 280° C.

4. Flame-resistant plastics according to claim 1, wherein at least 95% by weight of the trihydrazinotriazine, triguanidinotriazine or the phosphoric acid or boric acid salts thereof has a particle size of not more than 0.025 mm.

5. Flame-resistant plastics according to claim 1, which additionally contain other flame retardants.

6. Method of increasing the flame resistance of polyolefins, polyvinyl chloride, unsaturated polyesters, polyurethanes or polystyrene plastics, wherein trihydrazinotriazine, triguanidinotriazine or the phosphoric acid or boric acid salts thereof or mixtures thereof are added as flame-retardants to the plastics or to the reactive components for preparation of the plastics.

* * * * *